(12) United States Patent
Day

(10) Patent No.: US 10,709,052 B1
(45) Date of Patent: Jul. 14, 2020

(54) HELPING HANDLE SHOVEL SYSTEM

(71) Applicant: Mark T. Day, Dunedin, FL (US)

(72) Inventor: Mark T. Day, Dunedin, FL (US)

( * ) Notice: Subject to any disclaimer, the term of this patent is extended or adjusted under 35 U.S.C. 154(b) by 0 days.

(21) Appl. No.: 16/435,520

(22) Filed: Jun. 9, 2019

Related U.S. Application Data

(60) Provisional application No. 62/687,980, filed on Jun. 21, 2018.

(51) Int. Cl.
*A01B 1/02* (2006.01)
*B25G 3/38* (2006.01)
*B25G 3/20* (2006.01)

(52) U.S. Cl.
CPC ............... *A01B 1/026* (2013.01); *B25G 3/38* (2013.01); *B25G 3/20* (2013.01)

(58) Field of Classification Search
CPC ............. A01B 1/026; B25G 3/20; B25G 3/38
USPC .................................................... 294/58, 178
See application file for complete search history.

(56) References Cited

U.S. PATENT DOCUMENTS

| 483,477 | A | * | 9/1892 | Ryan | |
| 911,291 | A | * | 2/1909 | Byor | |
| 4,615,553 | A | * | 10/1986 | Hultine | A01B 1/22 16/426 |
| 4,793,645 | A | * | 12/1988 | Decker | A01B 1/026 294/58 |
| 5,133,582 | A | * | 7/1992 | Rocha | A01B 1/026 16/426 |
| 5,447,349 | A | * | 9/1995 | Coble | A01B 1/026 16/426 |
| 5,487,577 | A | * | 1/1996 | Ball | A01B 1/026 16/426 |
| 6,283,522 | B1 | * | 9/2001 | Renaud | A01B 1/026 294/58 |

* cited by examiner

*Primary Examiner* — Dean J Kramer

(57) ABSTRACT

A secondary shaft has a secondary upper end, a secondary lower end, and a secondary intermediate region. A grip is positioned on the secondary upper end of the secondary shaft. A coupling assembly releasably attaches the secondary shaft to a primary shaft of a shovel. The coupling assembly includes a resilient member coupled to the secondary lower end of the secondary shaft.

2 Claims, 2 Drawing Sheets

HELPING HANDLE SHOVEL SYSTEM

RELATED APPLICATION

This application is based upon and claims priority of Provisional Application 62/687,980 filed Jun. 21, 2018, the subject matter of which is incorporated herein by reference.

BACKGROUND OF THE INVENTION

Field of the Invention

The present invention relates to a two-handle shovel system and more particularly pertains to facilitating the shoveling of repetitive loads and minimizing strain on a shoveler. The facilitating is for abating injuries when lifting repetitive loads. The facilitating of shoveling, the abating of injuries, and the lifting of repetitive loads are done in a safe, comfortable, convenient, and economical manner.

Description of the Prior Art

The use of shovel systems of known designs and configurations is known in the prior art. More specifically, shovel systems of known designs and configurations previously devised and utilized for the purpose of facilitating the shoveling of repetitive loads and minimizing strain on a shoveler, abating injuries when lifting repetitive loads, in a safe, comfortable, convenient, and economical manner, are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the aforementioned patents do not describe a two-handle shovel system that allows facilitating the shoveling of repetitive loads and minimizing strain on a shoveler. The facilitating is for abating injuries when lifting repetitive loads. The facilitating of shoveling, the abating of injuries, and the lifting of repetitive loads are done in a safe, comfortable, convenient, and economical manner.

In this respect, the two-handle shovel system according to the present invention substantially departs from the conventional concepts and designs of the prior art, and in doing so provides an apparatus primarily developed for facilitating the shoveling of repetitive loads and minimizing strain on a shoveler. The facilitating is for abating injuries when lifting repetitive loads. The facilitating of shoveling, the abating of injuries, and the lifting of repetitive loads are done in a safe, comfortable, convenient, and economical manner.

Therefore, it can be appreciated that there exists a continuing need for a new and improved two-handle shovel system which can be used for facilitating the shoveling of repetitive loads and minimizing strain on a shoveler. The facilitating is for abating injuries when lifting repetitive loads. The facilitating of shoveling, the abating of injuries, and the lifting of repetitive loads are done in a safe, comfortable, convenient, and economical manner. In this regard, the present invention substantially fulfills this need.

SUMMARY OF THE INVENTION

In view of the foregoing disadvantages inherent in the known types of shovel systems of known designs and configurations now present in the prior art, the present invention provides an improved two-handle shovel system. As such, the general purpose of the present invention, which will be described subsequently in greater detail, is to provide a new and improved two-handle shovel system and method which has all the advantages of the prior art and none of the disadvantages.

To attain this, the present invention essentially comprises a two-handle shovel system. First provided is a secondary shaft having a secondary upper end, a secondary lower end, and a secondary intermediate region. A grip is positioned on the secondary upper end of the secondary shaft. A coupling assembly releasably attaches the secondary shaft to a primary shaft of a shovel. The coupling assembly includes a resilient member coupled to the secondary lower end of the secondary shaft.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved two-handle shovel system which has all of the advantages of the prior art shovel systems of known designs and configurations and none of the disadvantages.

It is another object of the present invention to provide a new and improved two-handle shovel system which may be easily and efficiently manufactured and marketed.

It is further object of the present invention to provide a new and improved two-handle shovel system which is of durable and reliable constructions.

An even further object of the present invention is to provide a new and improved two-handle shovel system which is susceptible of a low cost of manufacture with regard to both materials and labor, and which accordingly is then susceptible of low prices of sale to the consuming public, thereby making such two-handle shovel system economically available to the buying public.

Lastly, it is another object of the present invention is to provide a two-handle shovel system which can be used for facilitating the shoveling of repetitive loads and minimizing strain on a shoveler. The facilitating is for abating injuries when lifting repetitive loads. The facilitating of shoveling, the abating of injuries, and the lifting of repetitive loads are done in a safe, comfortable, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figures 1, 2:
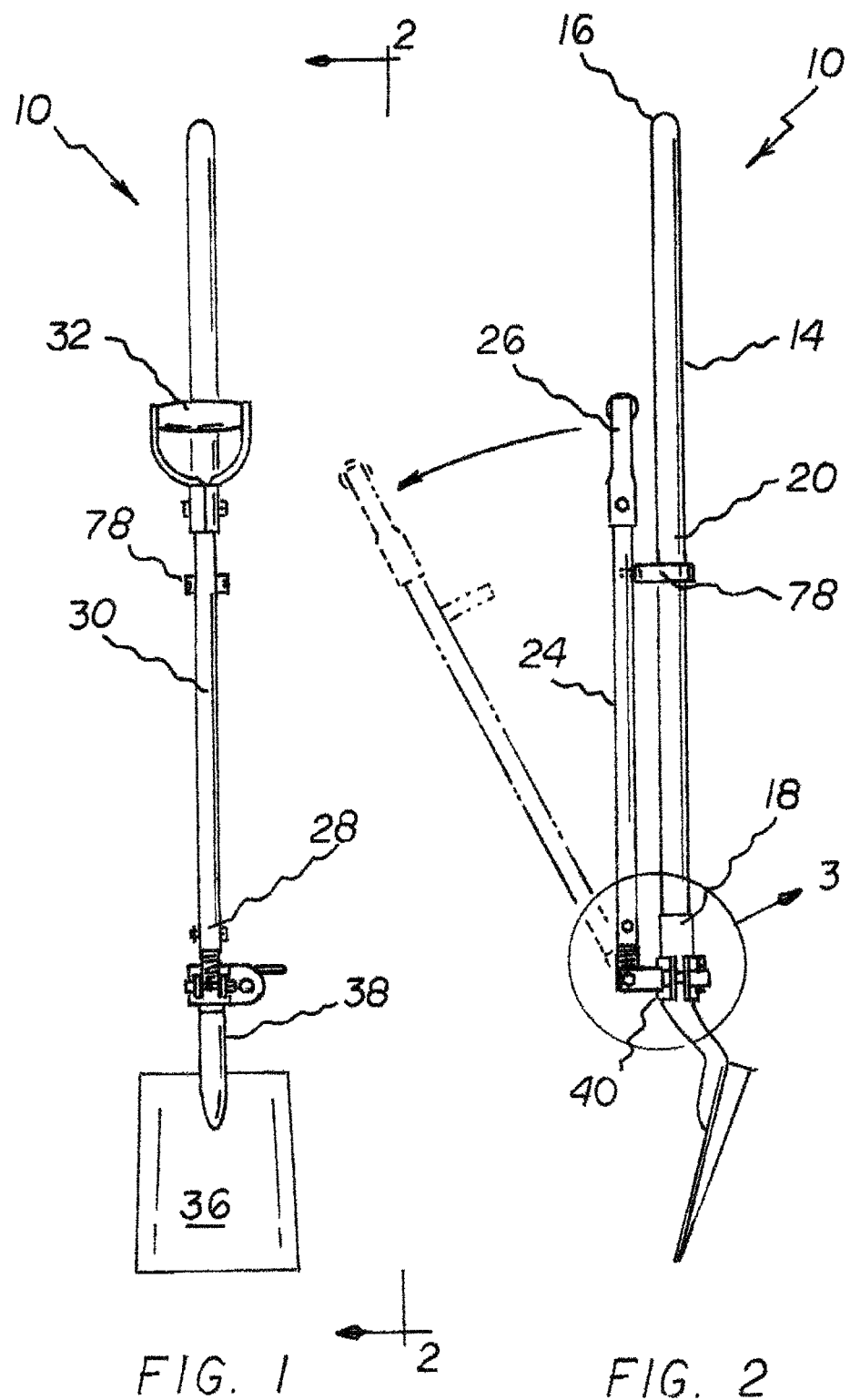
FIG. 1 is front elevational view of the two-handle shovel system constructed in accordance with the principles of the present invention.
FIG. 2 is a side elevational view of the two-handle shovel system shown in FIG. 1.
Figure 3:
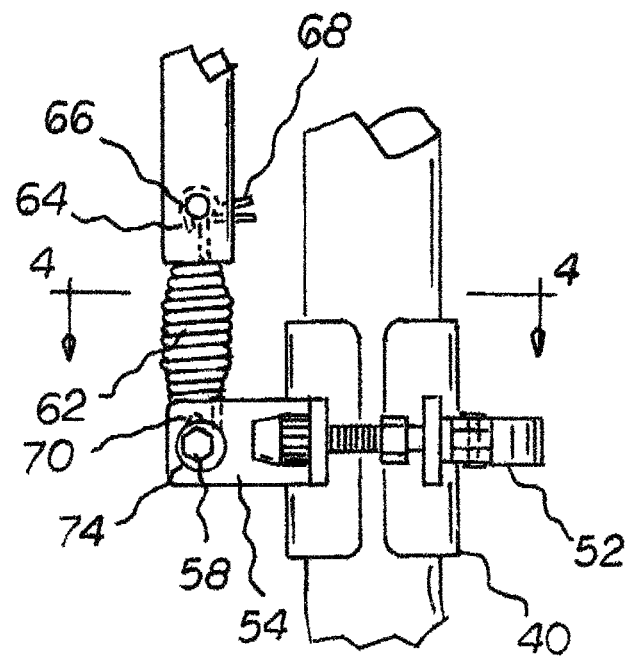
FIG. 3 is an enlarged view taken at circle 3 of FIG. 2.
Figure 4:
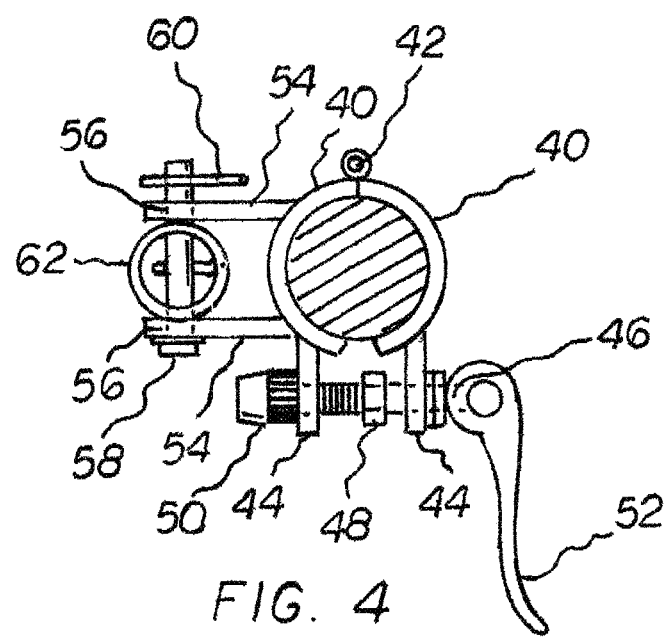
FIG. 4 is a cross sectional view taken along line 4-4 of FIG. 3.

With reference now to the drawings, and in particular to FIG. 1 thereof, the preferred embodiment of the new and improved two-handle shovel system embodying the principles and concepts of the present invention and generally designated by the reference numeral 10 will be described.

The present invention, the two-handles shovel system 10 is comprised of a plurality of components. Such components in their broadest context include a secondary shaft, a grip, a coupling assembly including a resilient shaft. Such components are individually configured and correlated with respect to each other so as to attain the desired objective.

In the preferred embodiment the two-handle shovel system 10 for shoveling heavy loads and for minimizing strain on a shoveler, first provided is a primary shaft 14. The primary shaft 14 has a primary upper end 16, a primary lower end 18, and a primary intermediate region 20 there between.

Next provided is a secondary shaft 24. The secondary shaft has a secondary upper end 26, a secondary lower end 28, and a secondary intermediate region 30 there between. The secondary shaft has a hollow cylindrical configuration.

Next, a grip 32 is provided. The grip has a generally cylindrical body with a left side and a similarly configured right side. A downwardly facing cylindrical extension is positioned on the secondary upper end of the secondary shaft. The downwardly facing cylindrical extension has side apertures for receiving a threaded fastener to secure the grip to the secondary shaft.

A blade 36 is next provided. The blade has an upwardly facing cylindrical extension 38 configured for receiving the lower end of the primary shaft.

Next, a coupling assembly is provided. The coupling assembly is adapted to releasably attach the secondary shaft to the primary shaft. The coupling assembly includes two plates 40 coupled by a pivot pin 42. Each plate has a semi-cylindrical configuration and is positionable to contact the primary shaft. Each plate has a primary arm 44 with a central primary aperture. A primary bolt 46 extends through the central primary apertures. The primary bolt has a free end and a head end. A central nut 48 is provided on the primary bolt between the primary arms. An end nut 50 on the primary bolt is secured to one primary arm remote from the head end. A rotatable handle 52 is attached to the primary bolt adjacent to the head end. In this manner, rotation of the handle will move the primary arms to grasp and release the primary shaft.

The coupling assembly has two secondary arms 54 with secondary apertures 56. A lower bolt 58 extends through the secondary apertures. The lower bolt has a head end and a free end. A lower keeper 60 is removably coupled to the lower bolt adjacent to the free end. A coil spring 62 has a top, a bottom, and a center there between. The coil spring is secured to the secondary shaft at a position aligned with the secondary shaft. The coil spring is heavy duty, fabricated of 0.125 inches, plus or minus 20 percent, stainless steel wire. The coil spring has a length of 2.0 inches, plus or minus 20 percent. The coil spring has a diameter of 1.0 inches, plus or minus 20 percent. The coil spring has an upper end with an inverted J-shaped hook 64. An upper bolt 66 in the secondary shaft receives the inverted J-shaped hook. An upper keeper 68 retains the upper bolt in a fixed orientation. The coil spring had a lower end with a J-shaped hook 70. The lower bolt receives the J-shaped hook. A washer 74 and the lower keeper 60 retain the lower bolt in a fixed orientation.

Lastly in the preferred embodiment, a pair of resilient retention fingers 78 are provided. The resilient retention fingers are fixedly attached to the intermediate region of the secondary shaft and are adapted to removably couple to the intermediate region of the primary shaft for transportation and storage purposes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A two-handle shovel system (10) for shoveling heavy loads and for minimizing strain on a shoveler, the system comprising, in combination:

a primary shaft (14), the primary shaft having a primary upper end (16), and a primary lower end (18), and a primary intermediate region (20) there between;

a secondary shaft (24), the secondary shaft having a secondary upper end (26), and a secondary lower end (28), and a secondary intermediate region (30) there between, the secondary shaft having a hollow cylindrical configuration;

a grip (32) having a generally cylindrical body with a left side and a similarly configured right side, and a downwardly facing cylindrical extension positioned on the secondary upper end of the secondary shaft, the downwardly facing cylindrical extension having side apertures for receiving a threaded fastener to secure the grip to the secondary shaft;

a blade (36) having an upwardly facing cylindrical extension (38) configured for receiving the lower end of the primary shaft;

a coupling assembly adapted to releasably attach the secondary shaft to the primary shaft, the coupling assembly including two plates (40) coupled by a pivot pin (42), each plate having a semi-cylindrical configuration and positionable to contact the primary shaft, each plate having a primary arm (44) with a central primary aperture, a primary bolt (46) extending through the central primary apertures, the primary bolt having a free end and a head end, a central nut (48) on the primary bolt between the primary arms, an end nut (50) on the primary bolt secured to one primary arm remote from the head end, a rotatable handle (52) attached to the Primary bolt adjacent to the head end whereby rotation of the handle will move the primary arms to grasp and release the primary shaft;

the coupling assembly having two secondary arms (54) with secondary apertures (56), a lower bolt (58) extending through the secondary apertures, the lower bolt having a head end and a free end, a lower keeper (60) removably coupled to the lower bolt adjacent to the free end, a coil spring (62) having a top, and a bottom, and a center there between, the coil spring secured to the secondary shaft at a position aligned with the secondary shaft, the coil spring being heavy duty, fabricated of 0.125 inches, plus or minus 20 percent, stainless steel wire, the coil spring having a length of 2.0 inches, plus or minus 20 percent, and a diameter of 1.0 inches, plus or minus 20 percent, the coil spring having an upper end with an inverted J-shaped hook (64) with an upper bolt (66) in the secondary shaft receiving the inverted J-shaped hook and an upper keeper (68) retaining the upper bolt in a fixed orientation, the spring having a lower end with a J-shaped hook (70) with the lower bolt receiving the J-shaped hook and a washer (74) and the lower keeper (60) retaining the lower bolt in a fixed orientation; and a pair of resilient retention fingers (78) fixedly attached to the intermediate region of the secondary shaft and adapted to removably couple to the intermediate region of the primary shaft for transportation and storage purposes.

2. A two-handle shovel system (10) for shoveling heavy loads and for minimizing strain on a shoveler, the system comprising, in combination:

a primary shaft (14), the primary shaft having a primary upper end (16), and a primary lower end (18), and a primary intermediate region (20) there between;

a secondary shaft (24), the secondary shaft having a secondary upper end (26), and a secondary lower end (28), and a secondary intermediate region (30) there between, the secondary shaft having a hollow cylindrical configuration;

a grip (32) having a generally cylindrical body with a left side and a similarly configured right side, and a downwardly facing cylindrical extension positioned on the secondary upper end of the secondary shaft, the downwardly facing cylindrical extension having side apertures for receiving a threaded fastener to secure the grip to the secondary shaft;

a blade (36) having an upwardly facing cylindrical extension (38) configured for receiving the lower end of the primary shaft;

a coupling assembly adapted to releasably attach the secondary shaft to the primary shaft, the coupling assembly including two plates (40) coupled by a pivot pin (42), each plate having a semi-cylindrical configuration and positionable to contact the primary shaft, each plate having a primary arm (44) with a central primary aperture, a primary bolt (46) extending through the central primary apertures, the primary bolt having a free end and a head end, a central nut (48) on the primary bolt between the primary arms, an end nut (50) on the primary bolt secured to one primary arm remote from the head end, a rotatable handle (52) attached to the primary bolt adjacent to the head end whereby rotation of the handle will move the primary arms to grasp and release the primary shaft;

the coupling assembly having two secondary arms (54) with secondary apertures (56), a lower bolt (58) extending through the secondary apertures, the lower bolt having a head end and a free end, a lower keeper (60) removably coupled to the lower bolt adjacent to the free end, a coil spring (62) having a top, and a bottom, and a center there between, the coil spring secured to the secondary shaft at a position aligned with the secondary shaft, the coil spring having an upper end with an inverted J-shaped hook (64) with an upper bolt (66) in the secondary shaft receiving the inverted J-shaped hook and an upper keeper (68) retaining the upper bolt in a fixed orientation, the spring having a lower end with a J-shaped hook (70) with the lower bolt receiving the J-shaped hook and a washer (74) and the lower keeper (60) retaining the lower bolt in a fixed orientation; and a pair of resilient retention fingers (78) fixedly attached to the intermediate region of the secondary shaft and adapted to removably couple to the intermediate region of the primary shaft for transportation and storage purposes.

\* \* \* \* \*